US008783924B1

(12) United States Patent
Zuiderveen

(10) Patent No.: US 8,783,924 B1
(45) Date of Patent: Jul. 22, 2014

(54) WIDE ANGLE ILLUMINATION ASSEMBLY AND REFLECTOR THEREFOR

(75) Inventor: Marc Zuiderveen, Hudsonville, MI (US)

(73) Assignee: Soundoff Signal, Inc., Hudsonville, MI (US)

(*) Notice: Subject to any disclaimer, the term of this patent is extended or adjusted under 35 U.S.C. 154(b) by 82 days.

(21) Appl. No.: 13/329,697

(22) Filed: Dec. 19, 2011

Related U.S. Application Data

(60) Provisional application No. 61/425,067, filed on Dec. 20, 2010.

(51) Int. Cl.
*F21V 7/00* (2006.01)
*B60Q 1/26* (2006.01)
*B60R 1/12* (2006.01)
*F21S 8/10* (2006.01)
*F21V 21/00* (2006.01)
*F21V 1/00* (2006.01)
*F21V 11/00* (2006.01)
*F21V 13/00* (2006.01)

(52) U.S. Cl.
USPC ........... 362/518; 362/494; 362/545; 362/241; 362/297; 362/304; 362/346; 362/348; 362/296.01; 362/243; 362/247

(58) Field of Classification Search
USPC ............ 362/494, 518, 519, 545, 241, 249.02, 362/297, 304, 346, 348, 350, 296, 1, 362/296.02–296.05, 341, 243, 245, 247; D26/118, 112, 108
See application file for complete search history.

(56) References Cited

U.S. PATENT DOCUMENTS

| | | | | |
|---|---|---|---|---|
| 4,965,876 A * | 10/1990 | Foldi et al. | | 362/247 |
| 5,471,371 A | 11/1995 | Koppolu et al. | | |
| 5,694,112 A * | 12/1997 | VannRox et al. | | 340/472 |
| 6,425,677 B1 * | 7/2002 | Chuang | | 362/243 |
| 6,851,835 B2 | 2/2005 | Smith et al. | | |
| 7,216,994 B2 * | 5/2007 | Pavao | | 359/841 |
| 7,712,931 B1 | 5/2010 | Smith | | |
| 8,033,683 B2 * | 10/2011 | Fields | | 362/231 |
| 2007/0153530 A1 | 7/2007 | Czajkowski | | |
| 2009/0219715 A1 * | 9/2009 | Peck et al. | | 362/235 |

* cited by examiner

*Primary Examiner* — Peggy Neils
*Assistant Examiner* — Erin Kryukova
(74) *Attorney, Agent, or Firm* — McGarry Bair PC

(57) ABSTRACT

A wide angle illumination assembly for mounting on a vehicle has a reflector with a multifaceted reflective surface of that defines a convex arcuate configuration in a predetermined plane and an plurality of LEDs positioned with respect to the multifaceted reflective surface to emit light onto the multifaceted reflective surface. The multifaceted reflective surface is configured and the LEDs are so positioned with respect to the multifaceted reflective surface so that the light emitted from the reflector has a luminous intensity of at least 50% of the maximum intensity of the light in a narrow band through an arc of at least 90° of the reflector in the predetermined plane.

22 Claims, 13 Drawing Sheets

WIDE ANGLE ILLUMINATION ASSEMBLY AND REFLECTOR THEREFOR

CROSS-REFERENCE TO RELATED APPLICATION

This application claims the benefit of U.S. Provisional Patent Application Ser. No. 61/425,067, filed Dec. 20, 2010, which is incorporated herein by reference in its entirety.

BACKGROUND OF THE INVENTION

1. Field of the Invention

This invention relates to lighting and illumination solutions for emergency vehicles and more particularly to wide angle illumination assemblies. In one of its aspects, the invention relates to a wide angle illumination assembly for a wide angle of illumination in a first dimension and a narrow angle in a second dimension that is perpendicular to the first dimension. In another of its aspects, the invention relates to a reflector that can generate a wide angle of illumination in one dimension and narrow angle of illumination in a second dimension that is perpendicular to the first dimension. In another of its aspects, the invention relates to the topology of a reflector that can generate a preferential shaping of optical output. In another of its aspects, the invention relates to a wide angle illumination assembly that is adapted to be mounted on an emergency vehicle. In another of its aspects, the invention relates to a wide angle illumination assembly that is adapted to be mounted on a side view mirror of a vehicle.

2. Description of Related Art

In addition to audible sirens, bright visible lights are commonly used on emergency vehicles to warn other drivers and pedestrians of their presence. Light may be emitted from the top, rear, front and the sides of the vehicles. For example, an emergency light may be mounted on top of a police vehicle that can be switched on from the inside of the police vehicle to notify others of emergency situations. Generally, it is difficult to mount lighting on some areas of an emergency vehicle such as the sides of the vehicle.

Additionally, there are challenges associated with emergency vehicle lighting in that a large spatial width or wide angle of illumination is desired in the horizontal direction relative to the ground and a much narrower spatial width or a narrower angle of illumination is desired in the vertical direction. In other words, the illumination source must provide light generated from one or more point sources with a high level of divergence in the horizontal direction and a low level of divergence in the vertical direction. In the horizontal direction it is desirable to have an illumination viewing angle up to 180° so that when the illumination source is mounted on the side of an emergency vehicle, the illumination can be viewed at any angle on one side of the vehicle. In some cases, it may be desirable to have illumination in 360°.

The illumination in the vertical direction must be at a height relative to the ground, so that it can be viewed by pedestrians and other vehicles on the road. Desirably the peak illumination intensity at a +/−5 degree vertical spread may be 75, 38, and 19 Candela for white, yellow, and red or blue light, respectively. Such a narrow viewing angle is difficult to achieve with non-coherent light source. Typically, multi-colored emergency lights have a combination of colors to achieve high visibility of the illumination source. Some colors, for example, red or blue, stand out more distinctly and therefore are more likely to get noticed than other colors, such as yellow or green. These emergency lights further have the ability to give the perception of a rotating light or a strobe light because these features draw greater attention to the illumination.

Energy efficiency of the emergency lighting is another important factor because these lights may be powered by a car battery for extended periods of time. Therefore, the emergency lighting should provide high levels of illumination with a low power draw from the battery. As a result, highly efficient sources of illumination are required, especially where a substantial amount of the power input to the illumination source is converted to optical output while minimizing thermal output.

Emergency lights are manufactured by companies such as Whelen Engineering Inc., Federal Signal, Code 3, Tomar, Rontan, and SoundOff Signal®.

Lighting assemblies with reflectors have been used for emergency vehicle lighting. Some examples of such assemblies are disclosed in U.S. Pat. Nos. 7,712,931, 5,471,371, and 6851835, and in US Published Patent Application No. 20070153530, the content of which references are incorporated herein by reference in their entirety.

Mercura manufactures and sells a cylindrical light fixture that has a concave curved reflector and multiple LEDs that are programmed to fire sequentially to produce a rotating beacon or that fire simultaneously to produce a circular flashing beam. Lenses are required to spread the reflected beam horizontally to reduce hot spots and to the focus the light in a horizontal plane.

BRIEF DESCRIPTION OF THE INVENTION

According to the invention, a wide angle illumination assembly comprises a reflector comprising a multifaceted reflective surface of that defines a convex arcuate configuration in a predetermined plane and a plurality of LEDs positioned with respect to the multifaceted reflective surface to emit light onto the multifaceted reflective surface. The multifaceted reflective surface is formed by multiple reflective portions. The multiple reflective portions include a first facet that has a concave parabolic topology wherein the first facet has a concave surface in a plane parallel to the predetermined plane and in a plane perpendicular to the predetermined plane. The multiple reflective portions include a second facet that has a convex parabolic topology wherein the second facet has a convex surface in a plane parallel to the predetermined plane and a concave surface in a plane perpendicular to the predetermined plane. The first and second facets are defined by a common parabolic curve. The first and second facets are joined to each other at a common meeting point along the common parabolic curve. The multifaceted reflective surface is configured and the LEDs are so positioned with respect to the multifaceted reflective surface so that the light emitted from the reflector has a substantially uniform luminous intensity of the light in narrow band through an arc of at least 90° of the reflector in the predetermined plane with a maximum intensity deviation of 25%.

The maximum intensity deviation ($I_{dev}$) is determined by measuring the maximum light intensity ($I_{max}$) and minimum light intensity ($I_{min}$) within the band and calculating the percent deviation according to the following formula:

$$I_{dev} = [1 - (I_{min})/(I_{max})] \times 100 \tag{1}$$

In a preferred embodiment, the maximum intensity deviation in the narrow band is less than 10%.

In one embodiment, the narrow band has an arc of at least 135°. In another embodiment, the narrow band has an arc of at least about 160°. In addition, the angular divergence of the narrow band perpendicular to the predetermined plane is less than 20°.

In one embodiment, the LEDs are mounted at a focal point of the parabolic curve. In addition, the LEDs can equal to the number of the number of reflective portions.

Further, at least one of the multiple facets can have a planar topology that joins the first and second facets. In addition, two of the multiple facets can have a planar topology that join the first and second facets and can be juxtaposed to each other in the predetermined plane. Further, there can be multiple reflective portions juxtaposed to each other along the predetermined plane and angularly disposed with respect to each other. The multiple reflective portions can be arranged in an arcuate pattern in the predetermined plane.

In another embodiment of the invention, the angular divergence of narrow band in the predetermined plane can be at least 130°, wherein intensity of light in the predetermined plane has an intensity level of at least 50% of a maximum intensity level of the light. In addition, the angular divergence of intense light in the narrow band can be at most 20°, wherein intensity of the light in the predetermined plane is at least 50% of a maximum intensity of the light.

Further according to the invention, a reflector comprises a multifaceted reflective surface formed by multiple reflective portions that are arranged in a planar arcuate configuration in a Y-Z plane to form a contiguous reflector surface in a predetermined arc. Each of the reflective portions are configured to include a parabolic curve in a plane transverse to the Y-Z plane, a first facet that has a concave parabolic topology and a second facet that has a convex parabolic topology. The first facet has a concave surface in a plane parallel to the Y-Z plane and in a plane perpendicular to the Y-Z plane. The second facet has a convex surface in a plane parallel to the Y-Z plane and a concave topology in the plane perpendicular to the Y-Z plane. The first and second facets are each defined by the parabolic curve swept about an axis of rotation spaced from the apex of the parabolic curve and transverse to the Y-Z plane. The first and second facets are joined to each other at a common meeting point along the parabolic curve. The multiple reflective portions are adapted to reflect light from a point source at the focal point of the parabolic curve with an angular divergence in a plane parallel to the Y-Z plane greater than an angular divergence of the reflected light perpendicular to the Y-Z plane.

In one embodiment, at least one of the multiple facets can have a planar topology that joins the first and second facets. In addition, two of the multiple facets can have a planar topology that join the first and second facets and are juxtaposed to each other. In addition, the two multiple facets can meet at a common point. Further, the first and second facets can be defined by a parabolic curve swept around an axis of rotation. The axis of rotation can be through the focal point of the parabolic curve or can be spaced from the focal point. In addition, the axis of rotation can be perpendicular to the longitudinal plane or at an acute angle to the longitudinal plane, for example, at 70°-90°.

In another embodiment, the parabolic curve or function can be approximated by a series of lines/curves that create the facets.

Further according to the invention, a vehicle comprises an electrical system and a side view mirror at one side thereof and has mounted beneath the side view mirror and electrically connected to the electrical system a wide angle illumination assembly. The wide angle illumination assembly comprises a reflector with an array of multiple reflective portions that define a convex arcuate configuration in a horizontal plane. Each of the reflected portions includes a multifaceted reflective surface and a plurality of LEDs positioned with respect to each of the multiple reflective portions to emit light onto the multifaceted reflective surface. The multifaceted reflective surface is configured and the LEDs are so positioned with respect to the multifaceted reflective surface so that the light emitted from the reflector has a substantially uniform luminous intensity in a narrow horizontal band through an arc of at least 80° of the reflector in a horizontal plane with a maximum deviation of less than 8%.

Still further according to the invention, a wide angle illumination assembly set forth above can further comprise a housing with at least one optically transparent element, a circuit board for distributing electricity mounted on the housing to energize the LEDs.

Further, the LEDs can be energized simultaneously or sequentially. Additionally, the electrical circuit can be configured to cycle each of the LEDs between an energized state and a de-energized state to provide a strobing illumination from the wide angle illumination assembly.

The reflected light emitted from the lighting element through the transparent element of the housing can have an angular divergence of intense light in the first dimension of at least 130°, and the intense light can have an intensity of at least 50% of a maximum intensity of the light. In one embodiment, the angular divergence of intense light in the second dimension is at most 30°, wherein intense light is light of intensity of at least 50% of a maximum intensity of the light.

In one embodiment, the wide angle illumination assembly further comprising a heat sink.

The apparatus according to the invention provides emergency lighting that can be easily mounted and reliably attached to a vehicle, especially to the side of the vehicle. In addition, the apparatus has a wide angle of illumination in one dimension and a narrow angle of illumination in a perpendicular direction.

DESCRIPTION OF AN EMBODIMENT OF THE INVENTION

The present invention is generally related to a wide angle illumination assembly for emitting an illumination pattern over a wide angle in one dimension and over a narrow angle in another dimension. More particularly, the invention relates to a wide angle illumination assembly and a reflector therefor for emitting an illumination pattern characterized by a wide angle of illumination in one direction and a narrow angle of illumination in another direction.

Figure 1:
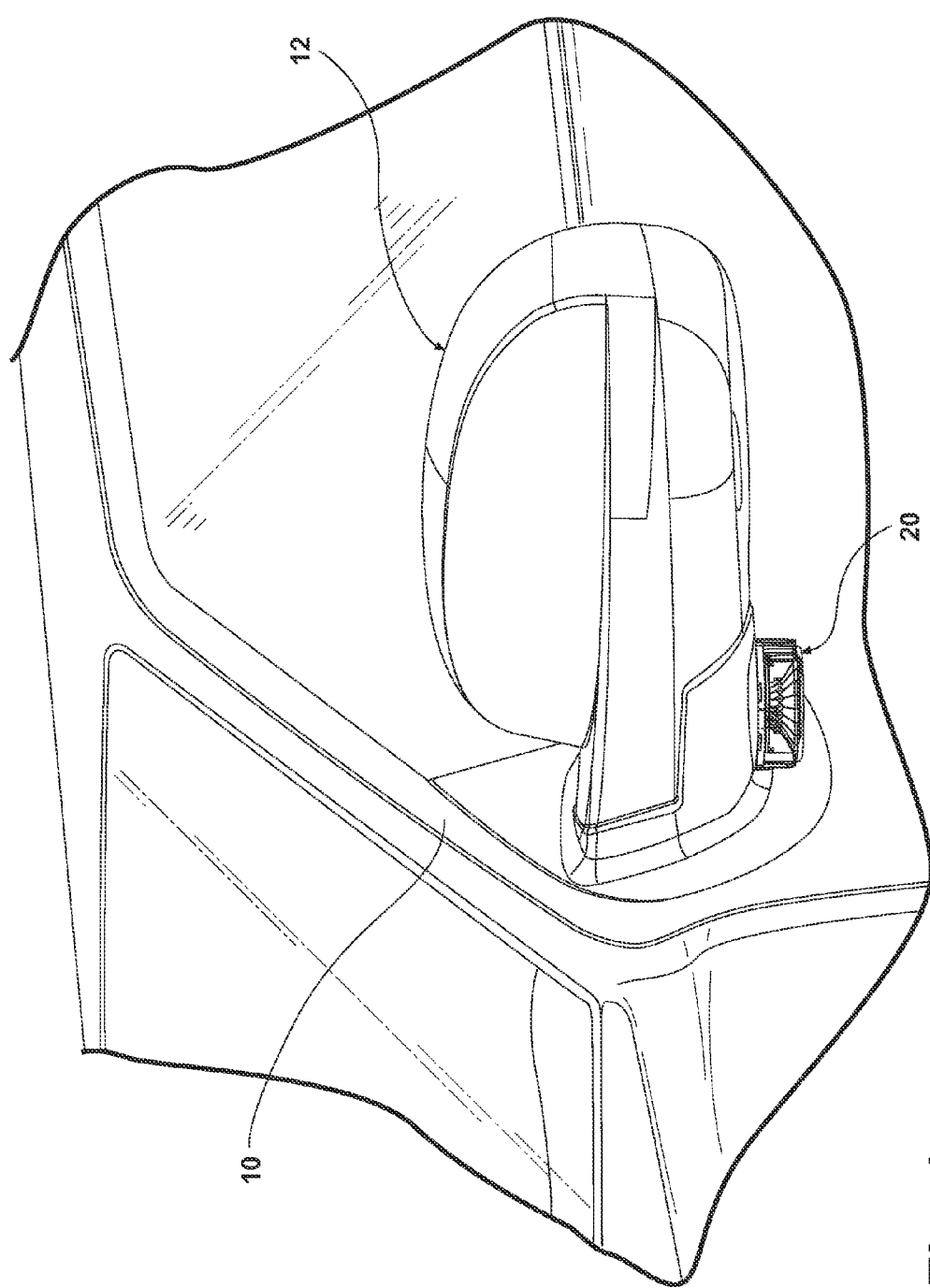
FIG. 1 is a schematic illustration of wide angle illumination assembly according to an embodiment of the invention mounted on the bottom of a vehicle side mirror.

Referring now to the drawings and to FIG. 1 in particular, wide angle illumination assembly 20 is mounted onto the underside of a side view mirror 12 on a vehicle 10. The bottom of the side view mirror 12 is a convenient location to mount the wide angle illumination assembly 20 as it provides an easy and low cost mounting without having to attach mounting brackets to the body of an emergency vehicle. The housing of the side view mirror 12 also serves as an aesthetic and convenient conduit for electrical power and control connections of the wide angle illumination assembly 20. The wide angle illumination assembly 20 can be properly aligned to the bottom of the side view mirror 12 by alignment features and attached to the bottom of the side view mirror 12 using mechanical fastening means such as screws as will be described further below.

Figure 2:
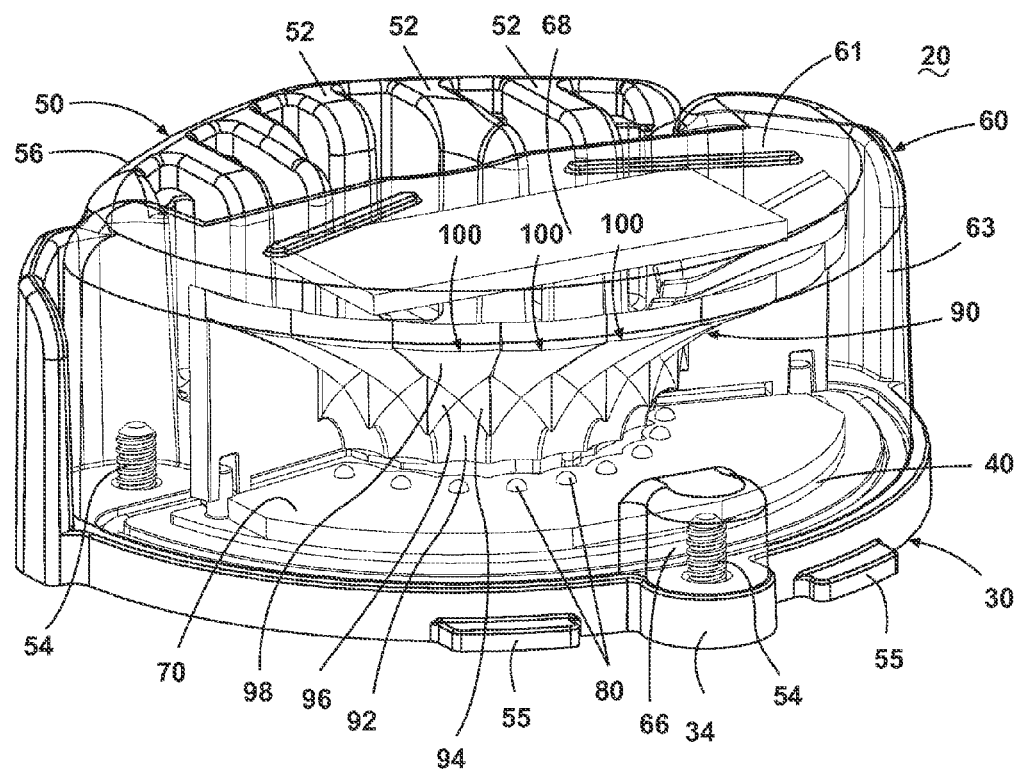
FIG. 2 is a perspective view of a wide angle illumination assembly of FIG. 1 in an inverted orientation.

Referring now to FIG. 2, the wide angle illumination assembly 20 comprises a top housing section 30, a back section 50, and a lower/side section 60 to encapsulate the wide angle illumination assembly 20 and provide mechanical protection to the other parts of the wide angle illumination assembly 20. The top housing section 30 has means to align and attach the wide angle illumination assembly 20 to the side view mirror 12 of the vehicle 10 such as by mounting tabs 55. A thermal transfer pad 40 is disposed upon the top housing section 30 to dissipate heat from the electrical components of the wide angle illumination assembly 20 when in operation. The back section 50 comprises a wall 56, extending in a substantially perpendicular direction from the top housing section 30, and ribs 52, extending therefrom, and provides mechanical rigidity to the wide angle illumination assembly 20. The lower/side section 60 is attached to both the back portion of the housing 50 and the top portion of the housing 30 with assembly screws 54. The lower/side section 60 forms a bottom wall 61 and a semi-cylindrical wall 63 of the housing. The lower/side section 60 is substantially optically transparent to the radiation emitted by the wide angle illumination assembly 20 the semi-cylindrical wall 63 forms a semi-cylindrical transparent window having an arc of about 180°. The arc of the a semi-cylindrical transparent window can vary over a relatively wide range, for example, from 90° to 235°, depending on the application of the reflector.

Multiple lighting elements, such as light emitting diodes (LEDs) 80 are electrically connected to a circuit board 70 and positioned in an arcuate array about a central axis. A reflector 90 is disposed in proximity of the lighting elements 80 to shape the beam of light that is emitted from the LEDs 80 before exiting from the wide angle illumination assembly 20.

The circuit board 70 selectively distributes electrical current to the LEDs 80 from a power source (not shown) to energize the LEDs. The circuit board is of a shape and size that it can fit inside of the housing comprising the top housing section 30, the back portion of the housing 50, and the lower/side section 60. The circuit board 70 can be any known type of circuit board including, but not limited to single sided circuit board, double sided circuit board, multilayer circuit board, through hole or surface mount boards, or combinations thereof and can be constructed with any known circuit board materials, including FR-4. The circuit board 70 has electrical traces made of metal, such as copper, that conducts electricity and heat from one point to another on the circuit board. In addition to the LEDs 80, the circuit board 70 can have a variety of passive or active electrical components electrically attached thereupon. Such components may include, but are not limited to resistors, capacitors, inductors, transistors, diodes, spark gaps, fuses, integrated circuits, or combinations thereof. The components, including the LEDs 80, may be electrically connected to the circuit board 70 using any known method including wave soldering or screen printed solder paste technology. Conventional lead-tin (Pb—Sn) solder materials may be used for making electrical connections on the power circuit 70. Alternatively, Tin-Silver-Copper (SAC) alloys may be used to comply with more stringent Restrictions of Hazardous Substances (RoHS) standards and more stringent lead contamination prevention standards in Europe and Japan.

When the circuit board 70 conducts a sufficient level of electrical current through the LEDs 80, the LEDs 80 emit light. The LEDs 80 generally emit light in all directions, but may have optical concentrators disposed thereupon to manipulate the optical output to preferential angles. All the LEDs 80 may be energized by the circuit board 70 at the same time or a subset of the LEDs 80 may be energized at any given time. Multiple subsets of LEDs may be energized and therefore provide illumination in a sequential manner. For example, a first LED 80 may be energized for 500 ms, followed by the next adjacent LED for a similar time period, followed by the next LED 80, until all of the LEDs 80 have been sequentially energized. Such a sequence of energizing the LEDs can provide an appearance of a rotating, or sweeping illumination, similar to the sweeping illumination from a lighthouse or a police light with a rotating reflector. Therefore, the appearance of a sweeping illumination can be achieved without moving parts, but by sequentially illuminating the LEDs 80.

A portion of the light emitted by the LEDs 80 passes through the lower/side section 60, a portion of the light is incident upon the circuit board 70 and a further portion of the emitted light is incident upon the reflector 90. The portion of the light that is incident upon the circuit board 70 is relatively less than the portion that is incident upon the reflector 90 or the portion that is directly emitted through the semi-circular wall 63. The portion that is incident upon the circuit board 70 is partially reflected in all directions and the reflected light may be either emitted through the semi-circular wall 63 or be incident upon the reflector 90. The light that is partially reflected from the circuit board is generally diffuse compared to the light that is emitted from the LEDs 80. The portion of light that is incident upon the circuit board 70 and is not reflected from the circuit board 70, is generally absorbed by the circuit board and the electrical circuitry disposed thereupon and is converted to thermal energy. The portion of the light that passes directly through the semi-circular wall 63 may emit from the wide angle illumination assembly 20 with a relatively large angular spread in both the horizontal and vertical directions. For example, the angular spread of the light in the horizontal direction can be approximately 130° and the angular spread of light in the vertical direction can be approximately 60°. On the other hand, the portion of the light that is incident upon the reflector 90 is reflected off of the reflector 90 and can emit from the wide angle illumination assembly 20 with a large angular spread in the horizontal direction and a relatively narrow angular spread in the vertical direction. For example, the angular spread of the light reflected from the reflector 90 in the horizontal direction can be approximately 180° and the angular spread of the light in the vertical direction can be approximately 30°. In other words, the angular and therefore the spatial spread of light reflected by the reflector 90 and emitted through the semi-circular wall 63 is greater in the horizontal direction and much narrower in the vertical direction than light that is emitted from the wide angle illumination assembly 20 without reflecting from the reflector 90.

The LEDs 80 may be any known type of LED. Colored light output may be achieved by using LEDs of a particular wavelength, with or without mixing with LEDs of other colors to produce mixed colors. The LEDs 80 in the wide angle illumination assembly 20 may be the same color or be different colors. For example, there may be 5 blue LEDs 80 and 4 red LEDs 80 within the wide angle illumination assembly 20. Red LEDs are typically fabricated with group III-V materials such as Gallium Arsenide (GaAs) or Aluminum Gallium Arsenide (AlGaAs), and green and blue LEDs are typically fabricated from group III-V materials such as Indium Gallium Nitride (InGaN) or Aluminum Gallium Phosphide (AlGaP), or group II-VI materials such as Zinc Selenide (ZnSe). Alternatively, the wide angle illumination assembly 20 may emit white, pink, or otherwise near-white light. To do so, the wide angle illumination assembly 20 may contain blue or UV wavelength LEDs with protective covers coated with phosphor of various colors to shift output wavelength from the shorter blue/UV wavelength to a range of longer wavelengths to produce a white or near-white optical output. As an alternative to inorganic LED based lighting, the wide angle illumination assembly 20 may contain organic light emitting diodes (OLEDs) or conventional incandescent filament based lighting. As a further alternative, colored light output may be achieved by providing a white or near-white optical output and having a colored lower/side section 60 to filter the optical output and only provide the wavelengths desired. Gen4 or Gen5 LEDs are preferred for the disclosed embodiments. Examples of suitable LEDs are: Lumileds P/N: LXML-PB01-0023 (blue); Lumileds P/N: LXML-PD01-0030-REEL-LF (red); Lumileds P/N: LXML-PWC1-0100 (white); and Lumileds P/N: LXML-PM01-0040-REEL-LF (green).

The housing sections 30 and 50 can be fabricated as a single piece by die-casting of Aluminum. As an alternative the housing sections 30 and 50 can be formed by die-casting of Zn, Mg, Al, or any alloys or combinations thereof. The lower/side section 60 can be formed with a transparent thermoplastic material such as polycarbonate formed by injection molding so that the piece is substantially transparent to the light emitted by the wide angle illumination assembly 20. The top housing section 30 and the back portion of the housing 50 are formed as a single piece. The lower/side section 60 is formed as a separate piece and mechanically attached to the top housing section using mechanical fasteners, such as screws. As an alternative the housing sections 30, 50, and 60 can be fabricated by injection molding of thermoplastic materials such as polyvinyl chloride (PVC), polycarbonate, polyurethane, or polyethylene terephthalate (PET).

The thermal transfer pad 40 disposed in proximity of the LEDs 80 and the circuit board 70 efficiently conducts heat generated near the LEDs 80 to the top housing section 30 and back portion of the housing 50 which serve as a heat sink. The thermal transfer pad 40 can be constructed of a material that is substantially electrically insulative and has a high thermal conductivity, such as sil pad. A specific example of such a material is Bergquist Bond-Ply® 100. There may optionally be disposed thermal interface material (TIM) or thermal grease on the thermal transfer pad 40 to improve the conduction of heat from localized hot spots to the thermal transfer pad 40 and to the housing sections 30 and 50.

The reflector 90 can be integrally formed in one piece with thermoplastic materials such as PVC, PET, or Noryl GTX 910 by injection molding and then coated with a reflective material. The coating step may entail painting the reflector 90 with reflective paint by dipping in reflective paint or aerosolized spray of reflective paint. Any known type of reflective paint may be used for these processes, including reflective paint containing metal and ceramic particles such as copper or aluminum. The reflector may also be coated using any known electroless plating or electroplating means, such as the plating of copper, cobalt, tin, or chromium. Further alternatives for providing a reflective coating may include known methods of vacuum metallization of aluminum. Yet further alternatives include physical vapor deposition (PVD) or chemical vapor deposition (CVD) of aluminum (Al), titanium (Ti), titanium nitride (TiN), gold (Au), silver (Ag), tungsten (W), Molybdenum (Mo), or the like. Generally a smooth surface finish with minimal defects is desired to achieve a high reflectance off of the reflector 90 surface. However, relatively inexpensive batch processing techniques may hold an advantage versus more expensive methods.

Figure 3:
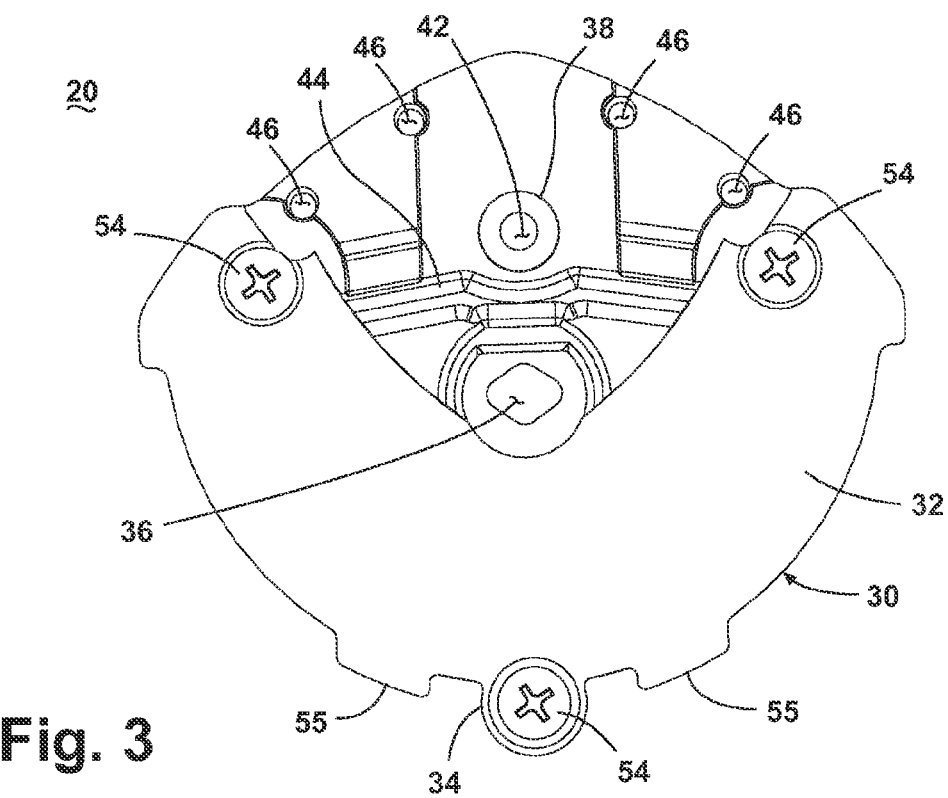
FIG. 3 is a top view of the wide angle illumination assembly of FIG. 2.

FIG. 3 is a top view of the wide angle illumination assembly 20 of FIG. 2 showing the top surface 32 of the top housing section 30. There is a fastener protrusion 34 at the front of the wide angle illumination assembly 20. Screw 54 is threaded into the fastener protrusion 34 and the top surface 32 to attach the lower/side section 60 to the top housing section 30. There are also disposed on the top surface 32 features used during the manufacture of the wide angle illumination assembly 20. These features include a rib 44 and cavity elements 46. The rib 44 serves as a dam during the manufacturing process to hold a curable liquid to seal any space around a power cable aperture 36 after a power cable (not shown) is threaded through the power cable aperture 36. The power cable aperture provides for the power cable, conducting electricity to power the LEDs 80 to pass to the inside of the wide angle illumination assembly 20. The cavity elements 46 are formed due to reciprocal protrusions in the die-cast mold used to form the housing sections 30 and 50, where these protrusions enable thermal conduction and to ensure a desired thickness control of the die-cast pieces.

A mounting element 38 is also present with a bore 42 therethrough for providing a fastener to hold the wide angle illumination assembly 20 to the surface on which it is mounted. For example, the shaft of a mounting screw (not shown) may pass through the bore 42 to affix the wide angle illumination assembly 20 to the bottom of the side view mirror 12 while mounting tabs 55 lock into reciprocal tab mounts (not shown) on a mounting wedge (not shown) which is attached on the bottom side of the rear view mirror 12.

Although screws 54 are shown to provide mechanical fastening between the lower/side section 60 and the top housing section 30, any known method can be used to fasten the two pieces, including any known type of fastener such as nails and Allen screws or non-fastener means such as thermo-sonic welding.

Figure 4:
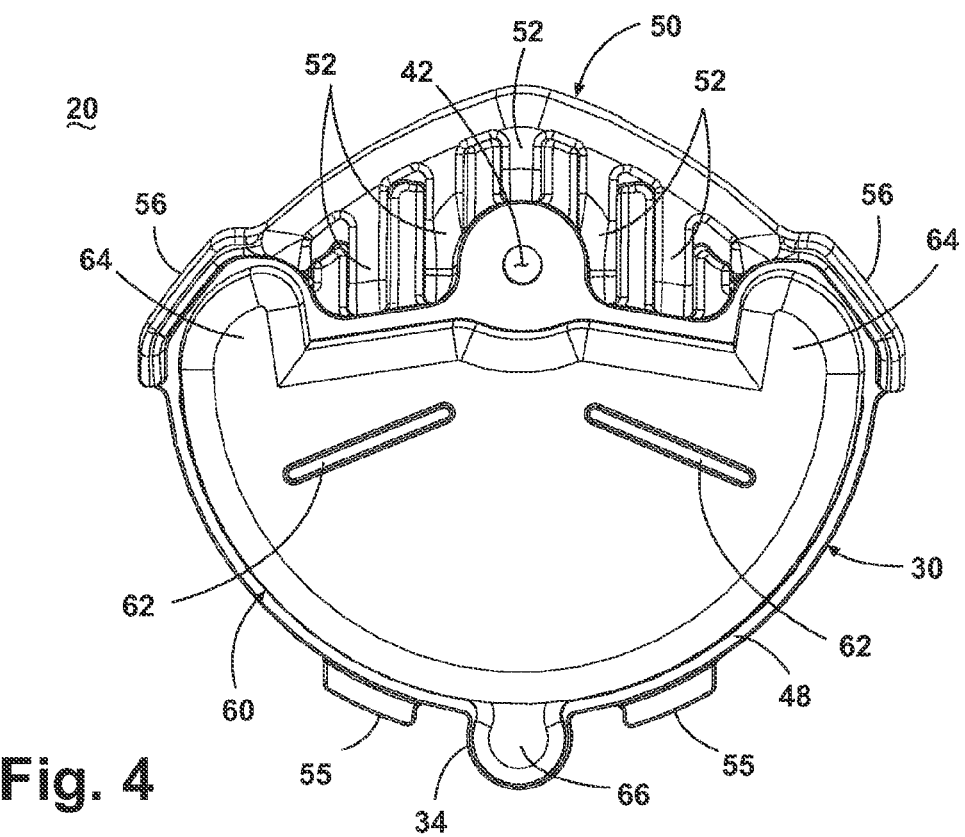
FIG. 4 is a bottom view of the wide angle illumination assembly of FIG. 2.

Referring now to FIG. 4 the lower/side section 60 is attached to a bottom surface 48 of the top housing section 30. The lower/side section 60 includes a front protruded portion 66 that overlies the fastener protrusion 34 of the top housing section 30 and is fastened thereto by screw 54. The lower/side section 60 also includes two rear protruded portions that lies over the top housing section 30 and is fastened thereto by screws 54. There are also protruded alignment ribs 62 disposed on the top surface of the lower/side section 60. The alignment ribs 62 provide an indication of how to orient the wide angle illumination assembly 20 during installation. One of the alignment ribs 62 indicates the required orientation on the driver's side and the other indicates the required orientation on the passenger side of the vehicle 10. The back portion of the housing 50 with a rear wall 56 is approximately the same height as the lower/side section of housing 60 and the multiple ribs 52 extending from the wall 56 to provide mechanical rigidity and strength to the wide angle illumination assembly 20 are the same height as the rear wall 56.

Figure 5:
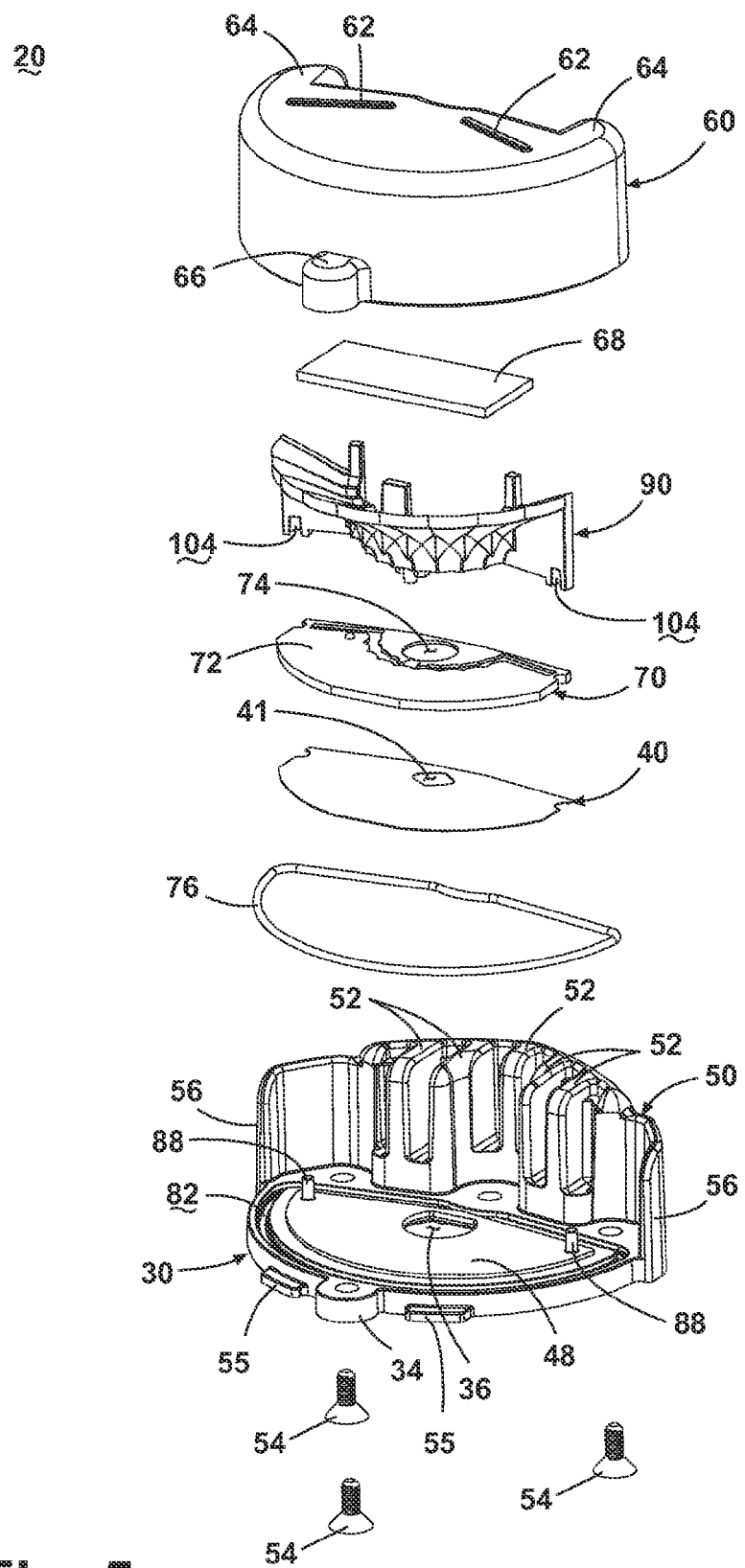
FIG. 5 is an exploded view of the wide angle illumination assembly of FIG. 2.

Referring now to FIG. 5, the wide angle illumination assembly 20 with the reflector sits atop the circuit board 70, which in turn sits atop the thermal transfer pad 40 on top of the bottom surface 48 of the top housing section 30. The circuit board 70 and thermal transfer pad 40 have a power cable apertures 74 and 41, respectively which along with power cable aperture 36 in the top housing section 30 provide a conduit for a power cord (not shown) to route within the wide angle illumination assembly 20 and deliver electrical power to the circuit board 70, which in turn distributes the electrical power to the LEDs 80 attached thereupon. A foam pad 68 is disposed on top of the reflector 90 to provide tolerance between the reflector 90 and the circuit board 70 and housing 30, 50, and 60 and provide a reliable seating of the reflector 90. The foam pad may be fabricated from any compressible material such as a urethane foam or PORON®. Reflector positioning protrusions 88 extend from the bottom surface 48 of the top housing section 30 to mate with reflector positioning cavities 104 on the reflector 90 for aligning the reflector 90 with the top housing section 30. There is also a gasket 76 that sits within a gasket recess 82 within the bottom surface 48 of the top housing section 30 such that the gasket is compressed by the sidewalls of the lower/side section 60 when attached to the top housing section 30. This provides a watertight seal, so that moisture cannot enter within the housing of the wide angle illumination assembly 20 and damage the components located therein. The gasket 76 can be formed from rubber or other similar compressible or elastomeric material. The compressibility of the gasket provides for a reliable seal at a wide range of temperatures compensating for the thermal expansion and contraction of the housing elements 30 and 60 and after multiple thermal cycling of the wide angle illumination assembly 20.

Figure 10:
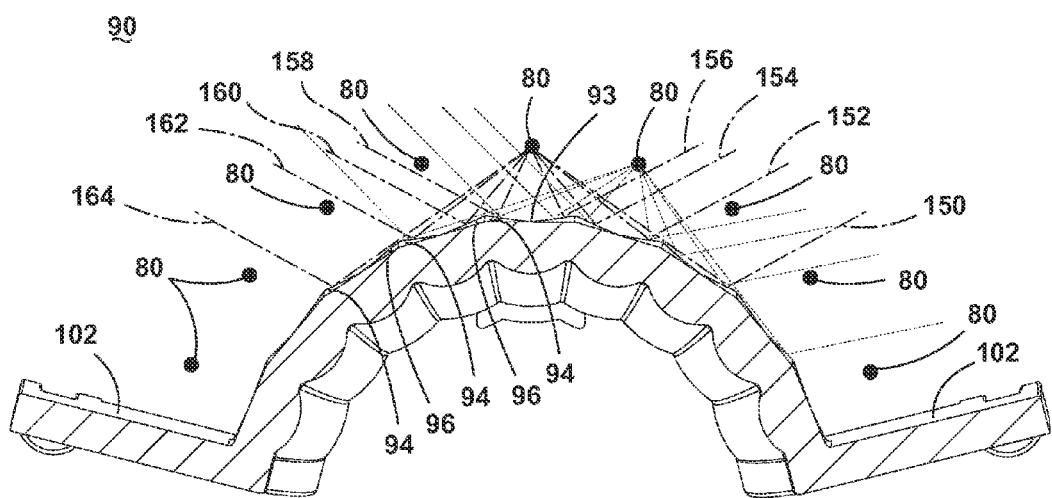
FIG. 10 is a horizontal cross-sectional view of the reflector of FIG. 6B taken along lines 10-10 of FIG. 6B and illustrating reflections off of the reflector in the plane 10-10.
Figure 11:
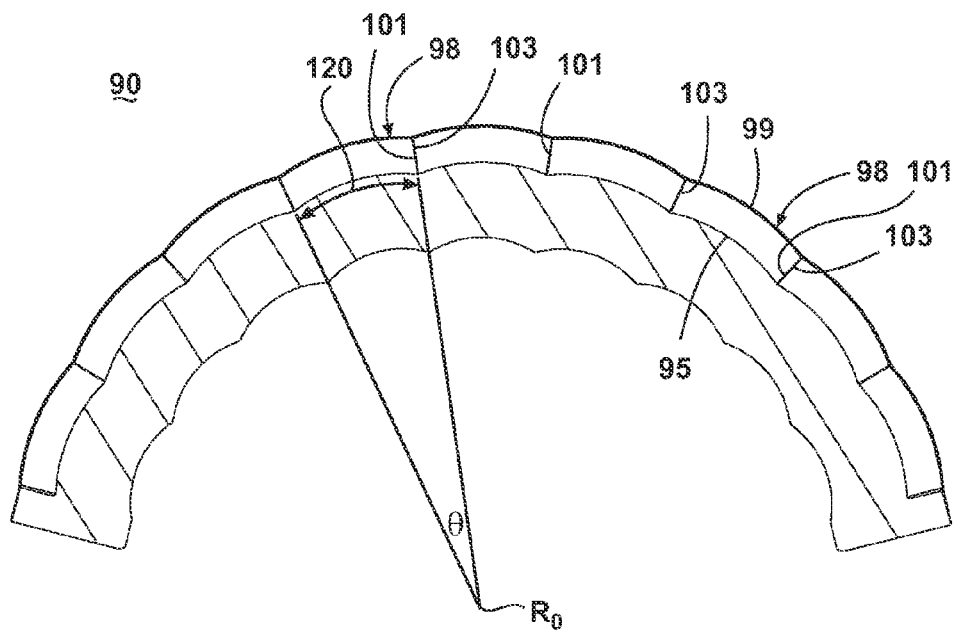
FIG. 11 is a horizontal cross-section view of the reflector near the edge of a second facet of the reflector taken along lines 11-11 of FIG. 6B.
Figure 12:
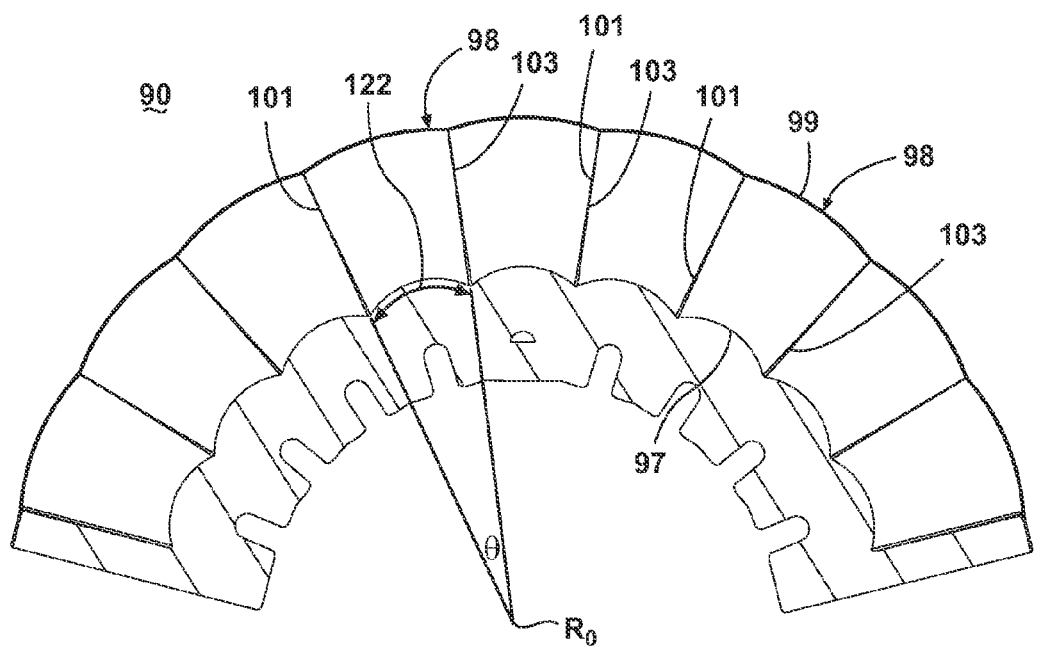
FIG. 12 is a horizontal cross-section view of the reflector near the base of a second facet of the reflector taken along lines 12-12 of FIG. 6B.
Figure 13:
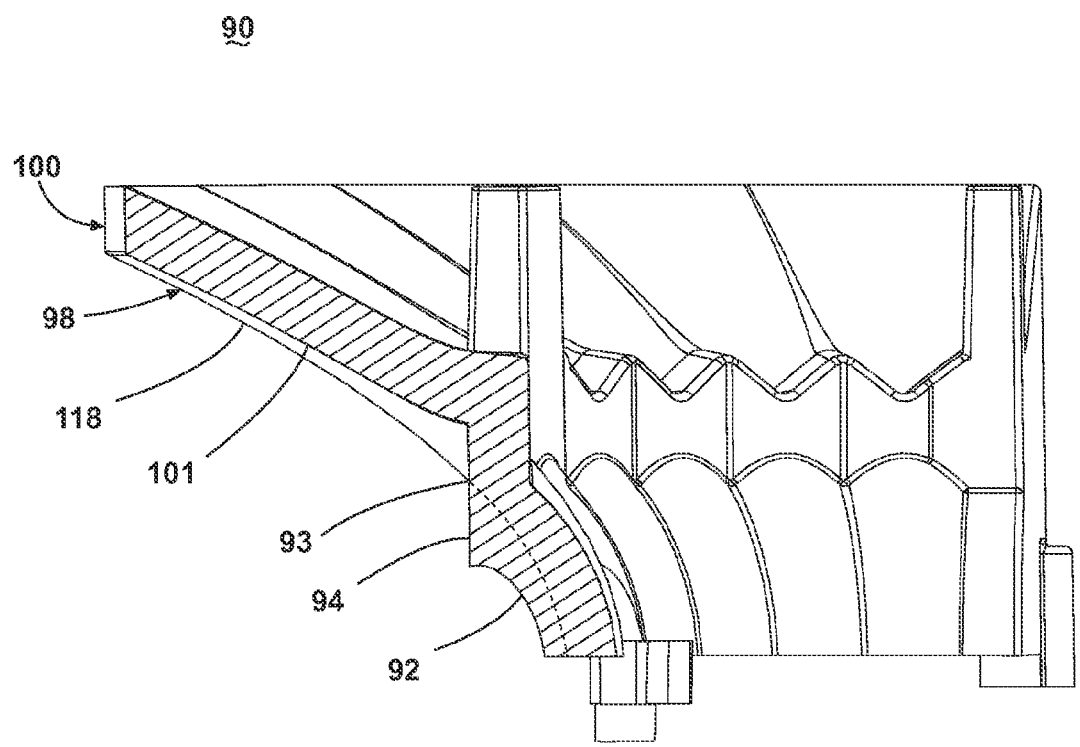
FIG. 13 is a vertical cross-sectional view of the reflector on the edge of a reflective portion taken along lines 13-13 of FIG. 6B.

Referring now to FIGS. 2 and 6A-13, the reflector design and operation will now be discussed. The reflective surface of the reflector 90 is generally convex in a horizontal plane as seen in FIGS. 12 and 13, for example, and extends through an angle of about 135° about the central axis $R_o$ and in a vertical cross sectional plane has a concave configuration that has elements of a parabolic curve as will be described hereafter. As can be seen the reflective surface is multifaceted and comprises multiple reflective portions 100 that are arrayed in a planar arcuate configuration. The reflective portions 100 are wedge shaped in plan or horizontal view so that they form a contiguous reflector surface of a predetermined arc. In the illustrated embodiment, the arc extends about 135° although the circumferential angle can vary depending on the desired spread of the generated light pattern. In this embodiment of the invention, the reflector 90 comprises 9 reflective portions 100, each offset from each other by 16.875° relative to the next adjacent section 100 and the reflector 90 forms a 135° wedge. This embodiment of the invention has one LED 80 in front of each of the reflective portions 100. Thus, the LEDs are arranged in an arcuate or curvilinear pattern that comports with the arcuate configuration of the array of the reflective portions 100. In practice, the invention can be employed to construct a reflector that extends through any angle up to 360° depending on the desired application. For example, the invention can be used for a rotating beacon that extends 360° with corresponding LEDs for each of the reflective portions 100. Preferably, the reflectors can be selected to generate a band of illumination that meets SAEJ845 specifications for any angle about the central axis of the reflector between 90° and 360°.

Each of the reflective portions 100 comprises four facets. The first facet 92 is most proximal to the LED 80 and the circuit board 70. A third facet 94 is disposed on the right side of the reflective portion 100 with the normal to the surface oriented to the right from the perspective of looking straight upon the reflector 100. A fourth facet 96 is disposed on the left side of the reflective portion 100 with the normal to the surface pointed partially to the left from the perspective of looking straight upon the reflector 100. A second facet 98 is most distal from the LEDs 80 and is positioned above the first, third and fourth facets. Each of the facets 92 and 94 has a different surface topology, and these two facets have a different topology from facets 96 and 98 in the reflective portion 100. These four facets meet at a facet meeting point 93. Light incident upon the surface of each of the four facets 92, 94, 96, and 98 is reflected in a different direction from each other.

The reflector 90 also comprises reflector walls 102 that provide structural strength to the reflector 90 and has disposed therein two reflector positioning cavities 104 that mate with two reflector positioning protrusions 88 extending from the top housing section 30 for positioning and holding the reflector in place on top of the circuit board 70 in the wide angle illumination assembly 20. The light reflected by each of the facets 92, 94, 96, and 98 of each section of the reflector 100 is primarily from the LED 80 that is in front of that section.

Although the invention has been described with respect to 9 reflective portions 100, the invention is not limited to any specific number of reflective portions. There can be more or less reflective portions, depending of the desired uniformity of the light distribution and the width of angle of reflection from the composite reflector 90. In general, the total angle of the reflector 90 is a function of the number of reflective portions 100 and the relative angle between each reflective portion 100 by the following relationship:

$$\text{Total\_reflector\_angle} = (n-1) * (\text{Relative\_angle}),$$

where Total_reflector_angle is the total angle spanned by the reflector, n is the number of reflective portions, and Relative angle is the relative angle between each adjacent reflective portion.

For example, the reflector can contain 8 reflective portions with each section at 20° angle to an adjacent section, such that the reflector spans a total 140°. Additionally, the number of reflective portions 100 may or may not be the same as the number of LEDs 80. The LEDs can be placed in different locations other than directly in front of each of the reflective portions 100. For example, an LED 80 may be located in front of the point where two reflective portions 100 meet and at the focal point of a parabola that defines the reflector. In a preferred embodiment, the focal point is at about 0.125 in (3.175 mm).

Figure 7:
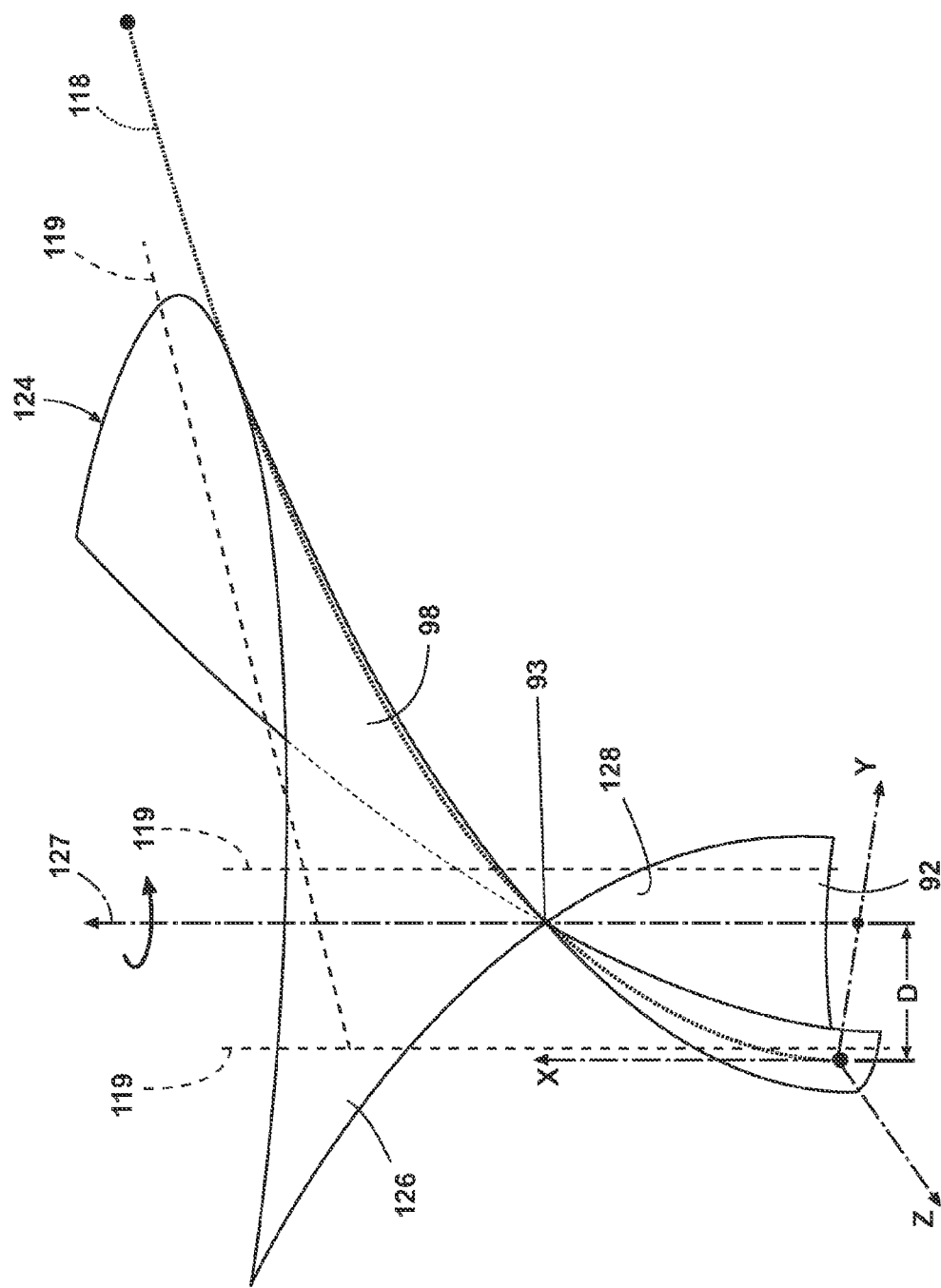
FIG. 7 is a view of a pair of surfaces formed by a sweeping a parabola around an axis that intersects the parabola to define two facets of the reflector.

Referring now to FIG. 7, the derivation of the surface topology of the first and second facets 92 and 98 of the reflective portion 100 is illustrated with the surface formed by a sweeping a parabolic curve 118 around a vertical axis 127 which is spaced the distance D from the x-axis. The parabolic curve, when swept 180° around a vertical axis 127 passing through the facet meeting point 93 forms the surface 124 as shown comprising a top portion of the surface 126 above the facet meeting point 93 in the vertical direction and a bottom portion of the surface 128 below the facet meeting point 93 in the vertical direction. The parabolic curve swept around the vertical axis 127 may be any function. For example, in this case, the shape of the parabola can be described as $y=-2x^2+0.375$ inches. Typically, the axis 127 will be perpendicular to the center axis of the parabolic curve 128 (the Y axis in FIG. 7) and will pass through the focal point of the parabolic curve 128 which is shown a distance D along the Y axis in FIG. 7. However, the axis 127 can deviate from 90° from the center axis of the parabolic curve 128, for example, up to 30° from perpendicular, and need not pass through the focal point of the parabolic curve 128. It can be positioned a spaced distance along the Y axis or off set from the Y axis as desired. Typically, the LEDs are positioned at the focal point of the parabolic curve 128 for the maximum concentration of the band of illumination in the longitudinal plane of the reflector but may be placed at an appropriate distance from the focal point to change the illumination pattern of the illumination assembly to suit the needs of the user.

The bottom portion of the surface 128 defines the topology of the first facet 92 of the reflective portion 100. A section of the top portion of the surface 126 defines the topology of the second facet 98. For example, truncating the top portion of the surface along a plane passing through dotted lines 119 (FIG. 7) defines the topology of the second facet 98. Therefore, both the first and second facets 92 and 98 are defined by a portion of a surface formed by rotating a parabolic curve 118 about an axis spaced from the apex, and parallel to the X-axis of the parabola. More specifically, the axis of rotation is the axis 127 shown in the FIG. 7 and is the vertical axis in the orientation of the reflector 90 shown in FIGS. 6B-9 and is spaced from the apex of the parabolic curve 118. Furthermore, the point where the axis of rotation intersects with the parabolic curve 118 defines the common point 93 of the four facets 93. The third and fourth facets 94 and 96 (not shown in FIG. 7 for clarity) are planar surfaces on either side of the facet common point 93, spanning a vertical distance between the first and second facets 92 and 98. Thus, the first facet 92 has a concave surface in both the vertical and horizontal planes. On the other hand the second facet 98 presents a convex cross-section with a horizontal plane and a concave cross-section in a vertical plane.

Figure 6A:
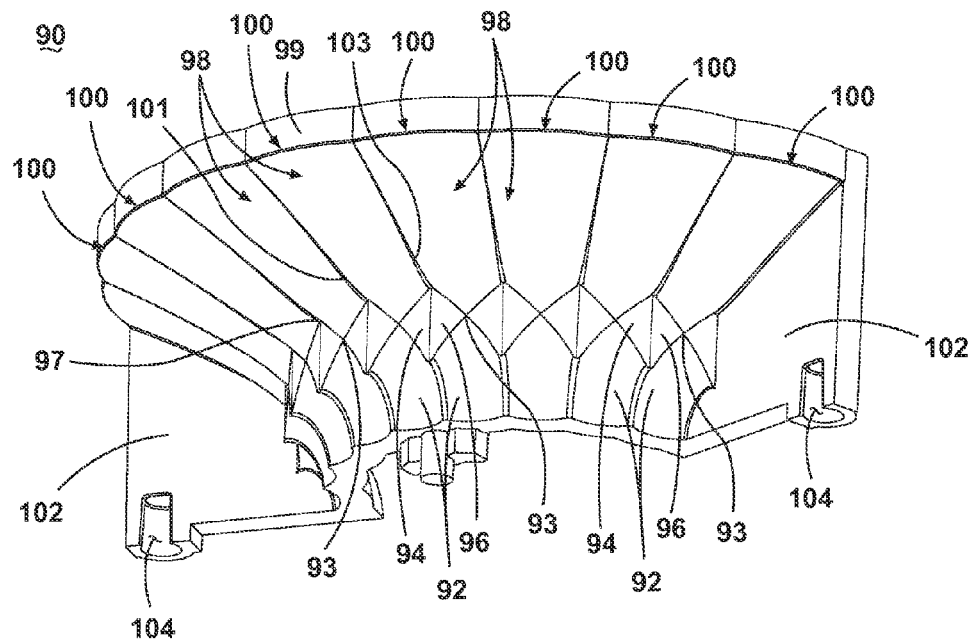
FIG. 6A is a perspective view of a reflector of the wide angle illumination assembly of FIG. 2.
Figure 6B:
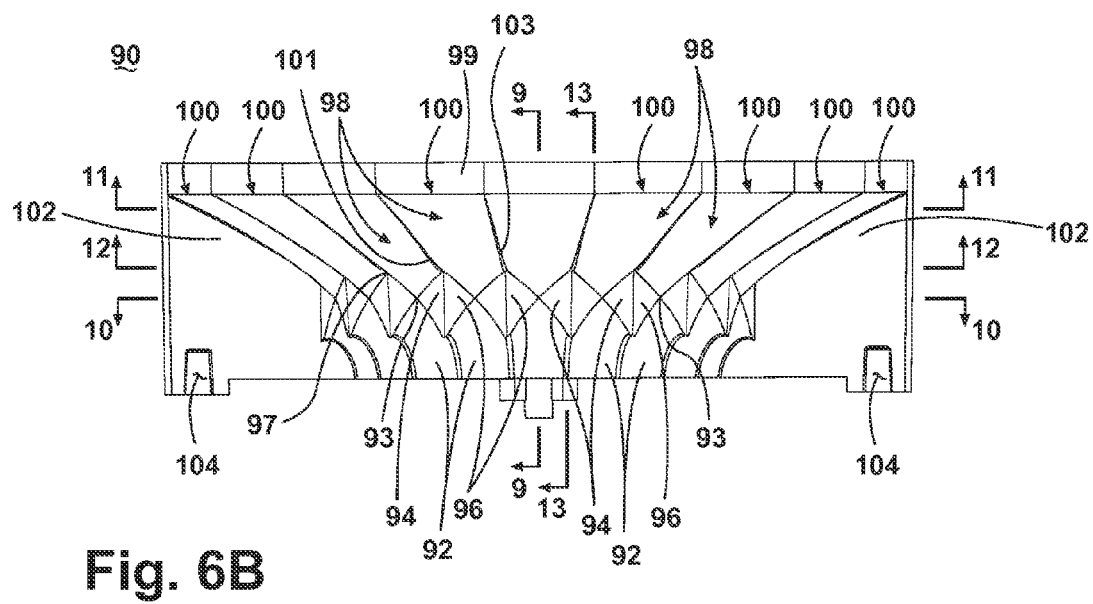
FIG. 6B is a front view of the reflector of FIG. 6A.
Figure 8:
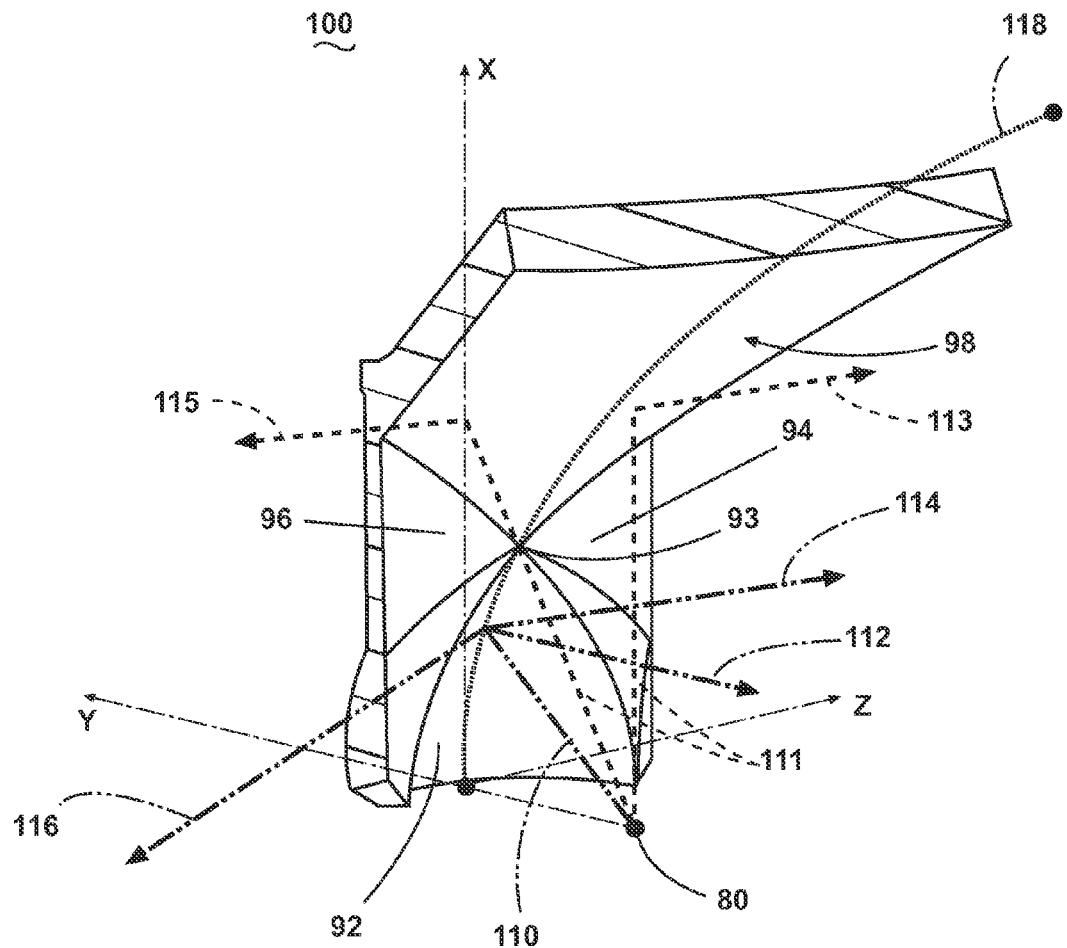
FIG. 8 is a perspective view of a section of the reflector of FIG. 6A showing the trajectory of light incident upon portions of the section of the reflector.

FIG. 8 is a perspective view of a section of reflector 90 of FIGS. 6A and 6B showing the trajectory of light incident upon various facets 92, 94, 96, and 98 of the reflective portion 100 from the light source such as the LED 80 providing rays of light 110 and 111 incident upon the first facet 92 and the second facet 98, respectively. The first facet 92 and the second surface 98 of the reflective portion 100 are a shape defined by a portion of a swept parabolic surface 126 and 128. The LED 80 is centered at the focal point of the parabolic curve 118 which is, for example, about 0.25 inches away from the base of the parabolic surface. However, the LEDs 80 have a non-negligible dimension and therefore light is emitted from points near but not exactly at the focal point. The light being emitted exactly at the focal point can be reflected with a vertical angular spread close to 0 degrees. However, due to the non-zero size of the LEDs 80, light emitted from a point offset from the focal point can be reflected from the various facets of the reflector with a non-zero degree vertical spread. Light reflected by the first facet 92 forms a narrow angle in the horizontal direction as represented by reflected ray 112 or in a wide angle in the horizontal direction as shown by reflected rays 114 and 116. Therefore the light emanating in the horizontal direction can be at a wide variety of angles. Light reflected by the second facet 98 forms a wide angle in the horizontal direction as shown by reflected rays 113 and 115. Additionally, the spread of light in the vertical direction is constrained by the second facet 98. At the same time, the third and fourth facets 94 and 96 reflect light at a wide angle in the horizontal direction. The third and fourth facets 94 and 96 have a planar or flat topology. A substantial portion of the light initially reflected at a wide angle in vertical direction from the third and fourth facets 94 and 96, respectively encounter the reflective surface of the second facet 98 that thereby constrains the spread of the light in the vertical direction after reflecting from the second facet 98. Therefore, the preferential location and geometry of the four facets 92, 94, 96, and 98 relative to each other promote light reflected from any of the facets in a wide vertical direction to have one or more subsequent reflections off of one of the other of the facets 92, 94, 96, ad 98 that constrain the light emanating from the wide angle illumination assembly 20 to a narrow angular spread in the vertical direction.

The planar third and fourth facets 94, 96, respectively, form an obtuse angle between them. The obtuse angle between them is determined by the location of the vertical sided edges of the facets 92 and 98. In other words, the planar third and fourth facets 94, 96, respectively, for planar transitional surfaces between the first and second facets, 92, 98, respectively and the angle between the third and fourth facets 94 and 96 will vary according the shape of the parabolic curve 118 and the width of each of the reflective portions 100. As seen in FIG. 10, the obtuse angles between the third facet 94 and the fourth facet 96 is greater than 180° and less than about 125°.

Although the reflective portion 100 has been shown with 4 facets, it may contain more or less facets without detracting from the scope of the invention. For example, there may be 5 facets instead of 4, where the fifth facet may be in contact with each of the other four facets at the center of the reflective portion 100.

Figure 9:
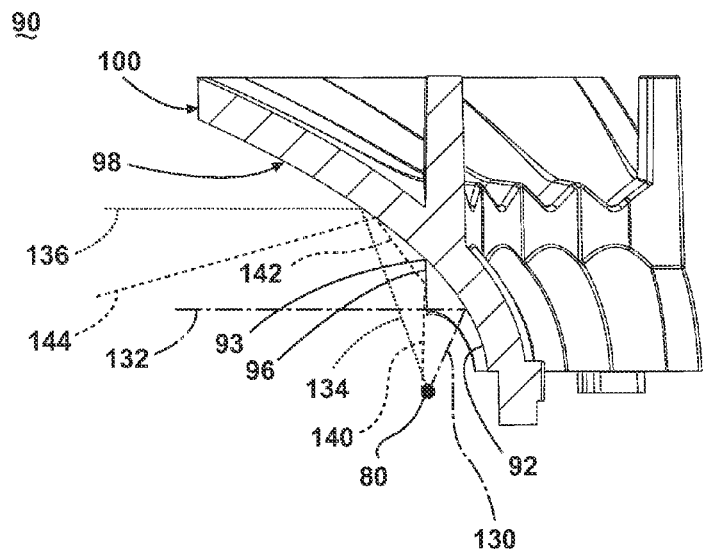
FIG. 9 is a vertical cross-sectional view of the reflector of FIG. 6B taken along lines 9-9 of FIG. 6B and illustrating reflections off of the reflector in the plane 9-9.

FIG. 9 is a vertical cross-sectional view through the facet meeting point 93 of the reflector 90 of FIG. 6B showing light reflections from the reflector, particularly from the first 92 and second facets 98. Optical ray 130 from LED 80 is incident upon the first facet 92 and reflects as ray 132 with a relatively narrow angle in the vertical direction and as a ray 132 propagating in a substantially horizontal direction. Similarly, ray 134 incident upon the second facet 98 is reflected 136 with a narrow angle in the vertical direction. Both rays 130 and 134 are shown as incident upon a parabolic surface 92 and 98 from the focal point of the parabola and therefore are reflected in a horizontal direction 132 and 136. Also shown is ray 140 incident upon the fourth facet 96 from a point offset from the focal point and reflecting off as a ray 142 at a wide vertical angle. Ray 142, however, has a secondary reflection off of the second facet 94, such that the reflected ray 144 has a relatively small angle in the vertical direction as it leaves the wide angle illumination assembly 20. The LED 80, although centered at the focal point of the parabola defined by facets 92 and 98, is not a point source of light with a non-negligible dimension and therefore provides light from points offset from the focal point. Due to the shape of the first 92 and second facet 98 of the reflector 90, the rays reflecting from those surfaces are constrained to a narrow divergence in the vertical direction.

FIG. 10 is a horizontal cross-sectional view through the facet meeting point 93 of the reflector 90 of FIG. 6B showing light reflections off of the reflector 90 from the third and fourth facets 94 and 96. The light from the LEDs 80 may reflect off of the most proximal reflective portion 100 as illustrated by rays 156 and 158 reflecting off of the fourth and third facets 96 and 94, respectively. Both reflected rays 156 and 168 have a wide angle in the horizontal direction as a result of the shape of the third and fourth facets. The light from an LED 80 may also reflect off of both the third and fourth facets 94 and 96 of adjacent of adjacent reflective portions as seen by reflected rays 152, 154, 160 and 162. The light from the LED 80 may also reflect off of one of the second 94 and fourth facet 96 of the next closest reflective portion 100 depending on the angular orientation of the multiple reflective portions 100 and the protrusion of the third and third reflector facets 94 and 96. In this case with the angle between adjacent reflective portions 100 of 16.875°, rays 150 and 164 reflect off of next adjacent reflective portions. The rays reflecting off of the third and fourth facets 94 and 96 of the reflective portion 100 can have a wide horizontal angular spread, whether the light source is the nearest, second nearest or third nearest LED 80. Therefore, the combination of all four facets 92, 94, 96, and 98 result in a wide angle of illumination in the horizontal direction and a narrow angle of illumination in the vertical direction.

Referring now to FIGS. 11 and 12, the relative arcs subtended by the second facet is discussed. A horizontal cross-section view of the reflector 90 near the edge 99 and 95 and near the facet meeting point 97 of the second facet 98 is shown as FIGS. 11 and 12, respectively. The angle of the second facet, θ, subtends a wider arc 120 near the edge 99 of the second facet 98 than an arc 122 closer to the facet meeting point 93. Each facet is further defined by right and left boundary edges 101 and 103 with an angle θ subtended therebetween. The angle θ is also the angle between each of the reflective portions 100 and is therefore a design criterion of the reflector.

FIG. 13 is a vertical cross-sectional view of the reflector on the right edge 101 of a reflective portion 100. The right edge 101 topology does not overlie the topology of the parabolic curve 118 of the reflector passing through the facet meeting point 93 as shown in FIG. 9 when projecting onto a 2 dimensional plane. In other words, due to the curvature of the first and second facets 92 and 98, the topology of each of the facets on the edge is different than the topology through the meeting point 93 of the four facets. In particular, the fourth reflector facet 98 is convex along a horizontal plane and concave along the vertical plane. The first facet 92, however, is concave along both the horizontal and vertical planes.

Figure 14:
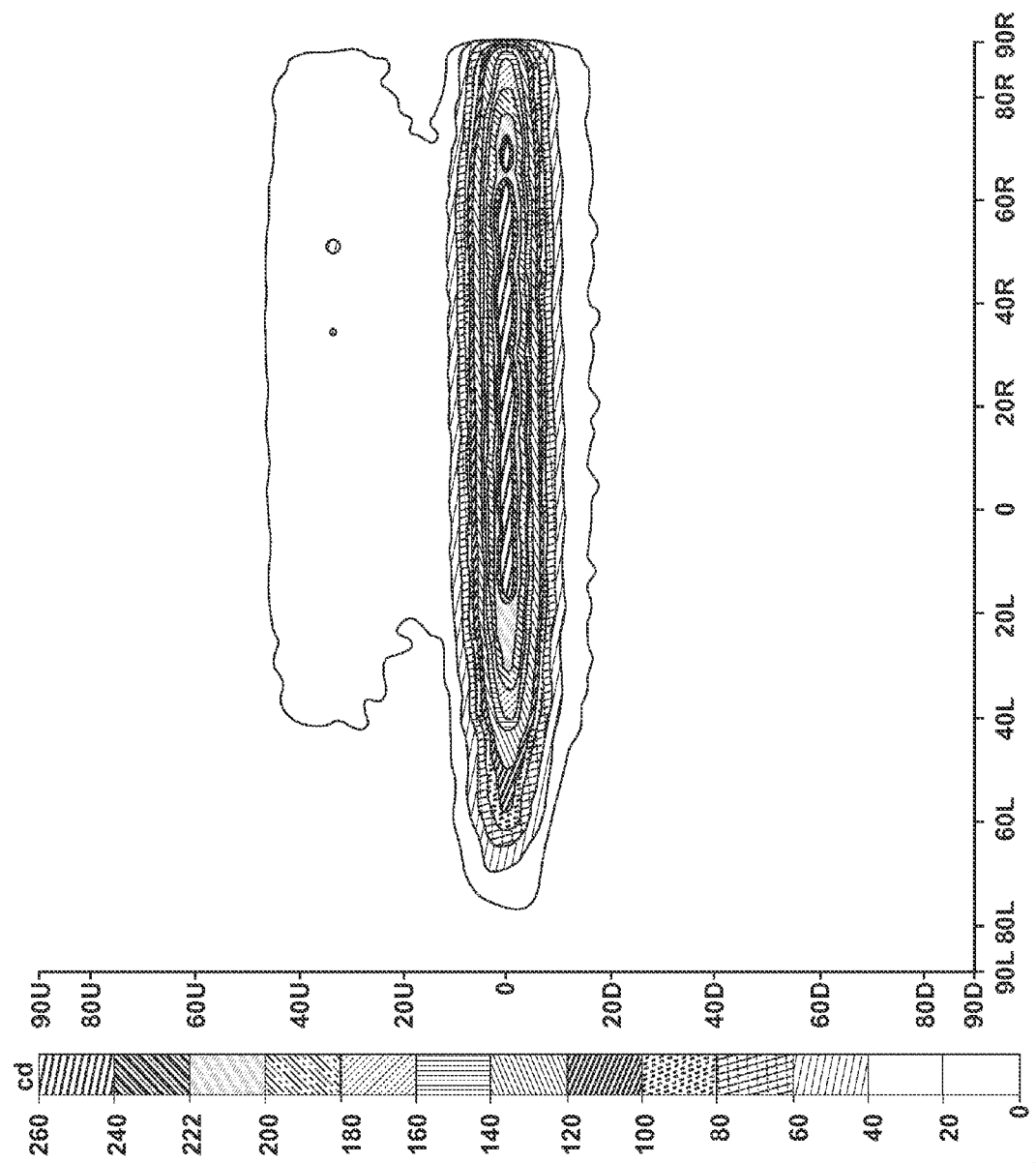
FIG. 14 is an iso-candela plot showing the intensity of the light emanating from the wide angle illumination assembly of FIG. 2 at various angles in both the vertical and horizontal directions.

FIG. 14 is an iso-candela or iso-intensity plot showing the relative intensity of the light emanating from the wide angle illumination assembly 20 at various angles in both the vertical (indicated by angles up "U" or down "D") and horizontal (angles to the left "L" and right "R") directions. This data has been generated using computer-based ray tracing simulations applied to the reflector 90 of the wide angle illumination assembly 20 that has an arc of 90° and with illumination of 10% of normal illumination intensity of the LEDs. The iso-candela has been shifted about 22° to the right in order to capture the entire spread of the iso-candela at the left. However, the iso-candela plot would be about 220° and be symmetrical about the center axis if not shifted to the right and the plot reflected the complete spread of the iso-candela plot. A high level of optical output, such as greater than 80 candelas, is constrained to about 8° up and 8° down for a total angular spread in the vertical direction of 16°. At the same time, an optical output of 200 candelas or greater from about 40° L to about 75° R for a total angular spread of 115° in the horizontal direction. In addition, the maximum intensity deviation throughout this range is no more than 25%. In addition, the angular spread of the illumination between 20L and 60R has a maximum intensity deviation of 20 candelas or less than 8%. Therefore, the simulation of the wide angle illumination assembly 20 shows a wide angle of substantially uniform optical output in the horizontal direction and a narrow angle of optical output in the vertical direction.

Figure 15:
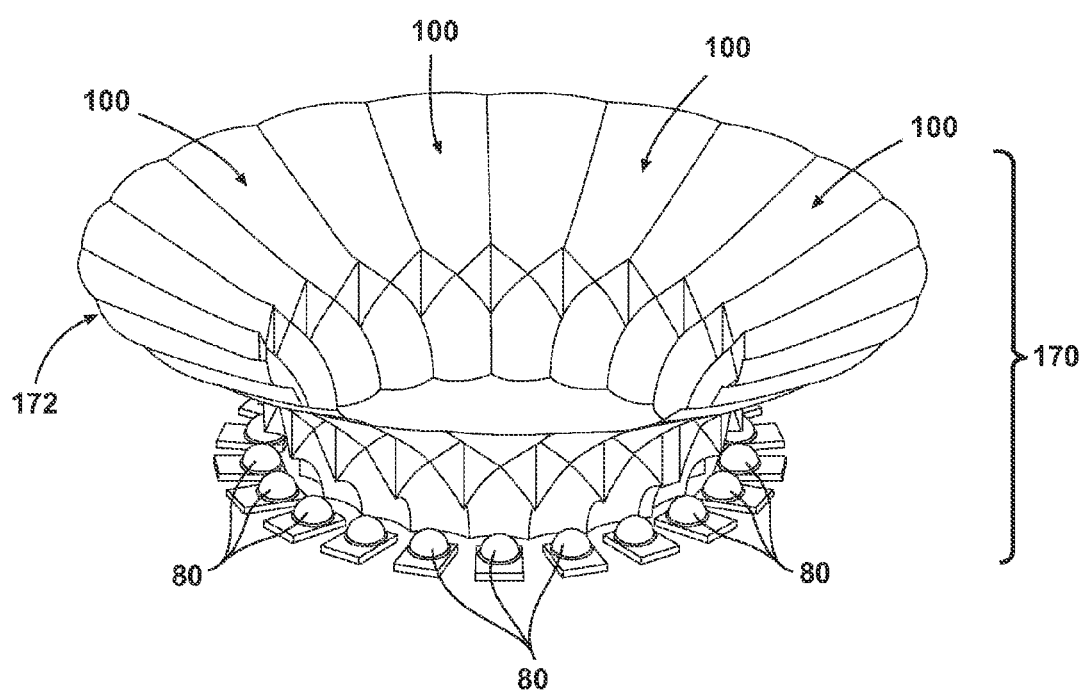
FIG. 15 is a perspective view of a wide angle illumination assembly according to the invention for producing a 360° beam.

Referring now to FIG. 15 where like numeral are used to describe like parts, a 360° illumination assembly according to invention has a cylindrical reflector 172 formed from multiple reflector portions 100 identical to the reflector portion 100 illustrated in FIGS. 2-13. In FIG. 15, the multiple reflector portions 100 have been continued to extend 360° rather than 180° shown in FIGS. 2-6. As in the first embodiment, a LED is positioned in front of each reflector portion 100 at the focal point of the parabola 118. The LEDs can be positioned offset from the focal point which will produce a slightly different pattern. The light patterned produced by the 360° illumination assembly is continuous throughout the entire 360° circumference of the reflector as illustrated in FIG. 16.

Figure 16:
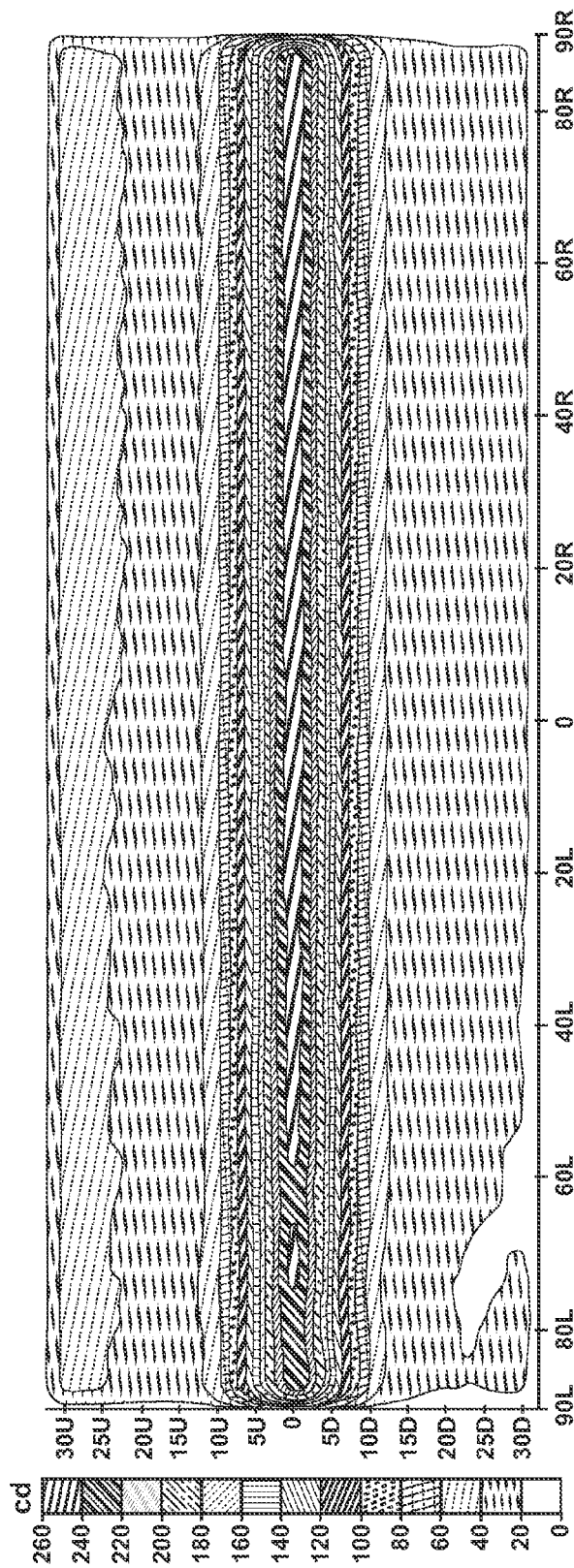
FIG. 16 is an iso-candela plot showing the relative light intensity of from the wide angle illumination assembly of FIG. 15 through and angle of 180°.

FIG. 16 is an iso-candela or iso-intensity plot showing the relative intensity of the light emanating though an arc of 180° from the wide angle illumination assembly 170 at various angles in both the vertical (indicated by angles up "U" or down "D") and horizontal (angles to the left "L" and right "R") directions. This data has been generated using computer-based ray tracing simulations applied to the reflector 172 of the wide angle illumination assembly 170 through an arc of 180°. The iso-candela plot shows that the illumination assembly 170 achieves a uniform horizontal spread of light with an intensity of at least 220 candelas at horizontal or 0+/−2-3° up and down, or about 5° about the 0 axis. Further the maximum intensity deviation throughout this range is no greater than 10%. Further, the iso-candela plot of FIG. 16 shows that the illumination assembly 170 achieves a uniform horizontal spread of light with an intensity of at least 140 candelas at 5° up and down from the horizontal 0 reference all without the aid of a secondary lens. In addition, the maximum intensity deviation of this light is no more than about 40%. This iso-candela plot demonstrates that the illumination assembly of FIG. 15 achieve the uniform spread of light to meet the SAE J845 specification.

The terms "horizontal" and "vertical" have been used herein as relative terms between two perpendicular directions or planes. The wide angle illumination assembly 20 has been shown as oriented to project a wide angle of optical output in a direction that is generally horizontal. However, the wide angle illumination assembly 20 can be shifted upwardly or downwardly at a small angle to change the vertical position at which the most intense optical output is seen at a distance.

Whereas the invention has been described with a single reflective surface 100, the scope of the invention includes a second parabolic reflective surface that is a mirror image of the reflective surface 100 and forms with the reflective surface 100 a concave reflector with LEDs mounted at the apex of both reflective surfaces so that the reflective surfaces would be in the shape of full parabola in horizontal cross section.

The advantages of the wide angle illumination assemblies 20 and 170 have been discussed herein. In one aspect, the wide angle illumination assemblies 20 170 provide a wide angle of optical output in one dimension while providing a narrow angle of optical output in a perpendicular dimension. This light distribution is advantageous because the spatial distribution of the optical output is such that it maximizes visibility by intended observers. For example, intended observers such as pedestrians may be at a height of between 4 feet and 7 feet and motorists may be at a height of between 3 feet and 10 feet from the ground. By concentrating light in a narrow angle in the vertical direction, the optical output can be constrained primarily in the spatial region where it provides maximum visibility and thereby a high level of visibility by intended observers without attenuating optical output into regions that do not provide a high level of visibility. In the horizontal direction, however, the wide angle illumination assembly 20 provides a continuous wide angle of illumination that can be viewed by as many people as possible at a wide variety of angles relative to the wide angle illumination assembly 20. Further, the arrangement of the reflective portions of the reflector provides a smooth, uninterrupted pattern of illumination throughout the entire spread of illumination and without any "hot spots."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Reasonable variation and modification are possible within the foregoing written description and the drawings without departing of the spirit of the invention which is set forth in the appended claims.

The invention claimed is:

1. A wide angle illumination assembly comprising:
    a reflector comprising a multifaceted reflective surface that defines an convex arcuate configuration in a predetermined plane;
    wherein the multifaceted reflective surface is formed by multiple reflective portions, the multiple reflective portions comprise a first facet that has a concave parabolic topology, wherein the first facet has a concave surface in a plane parallel to the predetermined plan and in a plane perpendicular to the predetermined plane, and a second facet that has a convex parabolic topology, where in the second facet has a convex surface in a plane parallel to the predetermined plane and a concave surface in a plane perpendicular to the predetermined plane, and the first and second facets are defined by a common parabolic curve, wherein the first and second facets are joined to each other at a common meeting point along the common parabolic curve; and
    a plurality of LEDs positioned with respect to the multifaceted reflective surface to emit light onto the multifaceted reflective surface;
    whereby the multifaceted reflective surface is configured and the LEDs are so positioned with respect to the multifaceted reflective surface so that the light emitted from the reflector has a substantially uniform luminous intensity in a narrow band through an arc of at least 90° of the reflector in the predetermined plane with a maximum deviation of 25%.

2. The wide angle illumination assembly of claim 1 wherein the narrow band has an arc of at least 120°.

3. The wide angle illumination assembly of claim 1 wherein the narrow band has an arc of at least 160°.

4. The wide angle illumination assembly of claim 1 wherein the angular divergence of the narrow band perpendicular to the predetermined plane is less than 20°.

5. The wide angle illumination assembly of claim 1 wherein the LEDs are mounted at a focal point of the common parabolic curve of each respective multiple reflective portions.

6. The wide angle illumination assembly of claim 5 wherein the number of the LEDs is equal to the number of multiple reflective portions.

7. The wide angle illumination assembly of claim 1 wherein the first facet has a concave shape along a plane perpendicular to the predetermined plane.

8. The wide angle illumination assembly of claim 7 wherein the second facet has a concave shape along a plane perpendicular to the predetermined plane.

9. The wide angle illumination assembly of claim 1 wherein at least one of the multiple reflective portions has a third facet with a planar topology that is joined to the first and second facets.

10. The wide angle illumination assembly of claim 1 wherein at least one of the multiple reflective portions has a third and a fourth facet with a planar topology that are joined to the first and second facets and are juxtaposed to each other.

11. The wide angle illumination assembly of claim 10 wherein there are multiple reflective portions juxtaposed to each other along the predetermined plane and angularly disposed with respect to each other.

12. The wide angle illumination assembly of claim 11 wherein the multiple reflective portions are arranged in an arcuate pattern in the predetermined plane.

13. The wide angle illumination assembly of claim 1 wherein the angular divergence of narrow band in the predetermined plane is at least 130°, wherein intensity of light in the predetermined plane has an intensity level of at least 50% of a maximum intensity level of the light.

14. The wide angle illumination assembly of claim 1 wherein the angular divergence of light in the narrow band is at most 20°, wherein intensity of the light in the predetermined plane is at least 50% of a maximum intensity of the light.

15. A reflector comprising a multifaceted reflective surface formed by multiple reflective portions that are arranged in a planar arcuate configuration in a Y-Z plane to form a contiguous reflector surface in a predetermined arc, each of the reflective portions comprising:
    a configuration that includes a parabolic curve in a plane transverse to the Y-Z plane;
    a first facet that has a concave parabolic topology, wherein the first facet has a concave surface in a plane parallel to the Y-Z plane and in a plane perpendicular to the Y-Z plane;
    a second facet that has a convex parabolic topology, wherein the second facet has a convex surface in a plane parallel to the Y-Z plane and a concave topology in the plane perpendicular to the Y-Z plane;
    a first and second facets are each defined by the parabolic curve swept about an axis of rotation spaced from the apex of the parabolic curve and transverse to the Y-Z plane and the first and second facets are joined to each other at a common meeting point along the parabolic curve;

wherein the at least one reflective portion is adapted to reflect light from a point source at the focal point of the parabolic curve with an angular divergence in a plane parallel to the Y-Z plane greater than an angular divergence of the reflected light perpendicular to the Y-Z plane.

16. The reflector of claim 15 wherein the reflective portions further have a third facet with a planar topology that joins the first and second facets.

17. The reflector of claim 15 wherein the reflective portions further have a third facet and a fourth facet with planar topologies that join the first and second facets and are juxtaposed to each other.

18. The reflector of claim 17 wherein the third and fourth facets meet at the common meeting point.

19. The reflector of claim 15 wherein the axis of rotation passes through the focal point of the common parabolic curve.

20. A vehicle comprising an electrical system and a side view mirror at one side thereof and further comprising a wide angle illumination assembly mounted beneath the side view mirror and electrically connected to the electrical system of the vehicle, the wide angle illumination assembly comprising:

a reflector comprising an array of the multiple reflective portions that define an convex arcuate configuration in a horizontal plane and each of the reflected portions comprises an multifaceted reflective surface;

a plurality of LEDs positioned with respect to each of the multiple reflective portions to emit light onto the multifaceted reflective surface;

wherein the multifaceted reflective surface is configured and the LEDs are so positioned with respect to the multifaceted reflective surface so that the light emitted from the reflector has a substantially uniform luminous intensity in a narrow horizontal band through an arc of at least 80° of the reflector in a horizontal plane with a maximum deviation of less 8%.

21. The reflector of claim 15 wherein the axis of rotation of the common parabolic curve is normal to the Y-Z plane.

22. The reflector of claim 21 wherein the axis of rotation passes through the focal point of the common parabolic curve.

* * * * *